2,776,893

CULINARY MIXES

Thomas P. Finucane, New Vernon, N. J., assignor to General Foods Corporation, White Plains, N. Y., a corporation of Delaware No Drawing. Application May 19, 1954,
Serial No. 430,979

16 Claims. (Cl. 99—92)

This invention relates broadly to culinary mixes and more particularly to dry mixes for use in preparing cakes of the foam batter or non-shortening type, and to a method for greatly improving such cakes.

Foam batter cakes such as angel food cakes, sponge cakes and chiffon cakes are generally considered the most difficult cakes to prepare. The recent development of cake mixes in this field, however, has greatly reduced the time and labor involved in preparing such cakes while assuring the housewife of reproducible and satisfactory results.

Cake mixes of the foam batter type usually comprise at least two packages, one of which contains a whippable material such as dried whole egg or egg white, sugar, and additives such as cream of tartar and sodium hexametaphosphate. A second package may contain flour and/or starch, additional sugar, dried egg yolk, a vegetable oil and additives such as cream of tartar and flavoring. To prepare a cake from such a mix, water is added to the ingredients of the first package containing the whippable material, said material is whipped to a stable foam and the ingredients of the second package are gently folded into the foam. The batter thus prepared is then ready for baking.

Cake mixes of the foam batter type comprising an intimate mixture of all the ingredients contained in one package and requiring only the addition of water, whipping and baking to prepare a cake have been developed. In addition, mixes contained in the usual two packages but requiring only that the second package be well mixed into instead of folded into the reconstituted whipped first package have also been developed.

The principal problem involved in providing any of the dry mixes described above is in obtaining a performance from the dried egg content of such mixes approaching the performance of an equivalent amount of fresh eggs. The eggs, whether whole egg or egg white, are frequently denatured to some extent in the course of drying. Further damage occurs on storage and handling. Moreover, dried eggs are less effective than fresh eggs when used in combination with certain kinds of flour. For example, they may provide a good foam but when flour is added and the batter baked a good cake does not result.

Another important problem concerns the sensitivity of a dry mix to the method of preparation employed in reconstituting, whipping, folding in, baking, etc. It has been a common experience to find that certain cake mixes provide extremely good quality, large volume cakes when prepared under carefully controlled conditions but are far less successful when prepared in the home by the housewife. The tolerance to recipe variation of all the presently available mixes of the foam batter type is extremely limited.

Objects of this invention include the provision of a composition of matter for use in preparing foam batter type cakes which results in cakes of increased volume, excellent texture and increased recipe tolerance, particularly when dried eggs are employed in a dry cake mix.

These and other objects will become apparent from the following detailed description of the invention.

It has now been discovered that the use of metal soaps in the course of preparing a foam batter type cake achieves the above objects.

By metal soaps is meant the metal salts of the saturated and unsaturated higher fatty acids. The lithium, sodium, potassium, copper, rubidium, cesium, magnesium, calcium, zinc, strontium, cadmium, aluminum, titanium, tin, manganese, iron, cobalt, nickel thalium and like metal soaps of acids such as caprylic, pelargonic, capric, n-undecylic, lauric, n-tridecylic, myristic, n-pentadecylic, palmitic, margaric, stearic, n-nonadecylic, arachidic, n-heneicosoic, behenic, n-tricosoic, lignoceric, n-pentacosoic, cerotic, n-heptacosoic, montanic, n-nonacosoic, melissic, n-hentriacontoic, n-dotriacontoic, n-tetratriacontoic, ceroplastic, n-hexatriacontoic, n-octatriacontoic, n-hexatetracontoic, $\alpha$-methylbutyric, isovaleric, pivalic, 2-ethylhexoic, obtusilic, caproleic, 10-undecylenic, lauroleic, physeteric, myristoleic, palmitoleic, petroselenic, petroselaidic, oleic, elaidic, vaccenic, gadoleic, cetoleic, erucic, brassidic, selacholeic, ximenic, lumequeic, propiolic, tetrolic, 4-pentynoic, dehydroundecylenic, tariric, stearolic, behenolic, isanic, ricinoleic, licanic, sorbic, linoleic, linolehaidic, hiragonic, $\alpha$-eleostearic, $\beta$-eleostearic, punicic, linolenic, elaidolinolenic, pseudoeleostearic, moroctic, $\alpha$-parinaric, $\beta$-parinaric, arachidonic, clupanodonic, nisinic are among the soaps which provide the desired results of the present invention. The metal soaps of fatty acids containing two or more double bonds will provide the desired results; however, provision should be made to overcome their tendency to rancidity.

All metal soaps provide some improvement when used in accordance with the present invention. The amount of a particular metal soap which should be used for maximum effect, however, varies to some extent, although all the soaps follow a similar pattern. For example, with many soaps such as calcium and magnesium oleates, calcium, sodium, magnesium and aluminum myristates, calcium, aluminum, sodium and magnesium stearates, and calcium, sodium and magnesium palmitates, good results are obtained in preparing an angle food cake using 10–400 mg. of soap/38.2 g. of dried egg white and optimum results are obtained using 40–200 mg. of soap/38.2 g. of dried egg white. The amount of soap which is most effective will vary somewhat not only with the soap, but also with the specific recipe in which it is used.

The dried egg white need not be employed in the amount of 38.2 g. mentioned above. Rather the amount of dried egg white employed in an angel food cake mix can be varied widely and within reasonable limits is determined solely by cost and quality considerations. Also, the amount of metal soap to be used in accordance with the invention may be expressed in terms of the dried egg white, for example, as being about 0.02–1.0%, preferably 0.1–0.5%, by weight of the dried egg white used in the angel food cake mix. The metal soaps are employed at similar levels when used with other foam batter cakes such as sponge and chiffon cakes, it being generally unnecessary to use more of the metal soap than is equal to 1.0% by weight of the weight of the dried egg material. In addition to dried egg white, flour, sugar and the other ingredients contained in an angel food cake mix, sponge cake mixes contain dried egg yolk and chiffon cake mixes contain both egg yolk and a vegetable oil.

The amount of metal soap employed in sponge and chiffon cake mixes should be about 0.02–1.0% of the egg white present in the mix, preferably about 0.1–0.5%.

Whatever amount of metallic soap is used must be well mixed with the other ingredients to achieve the best results. In the case of a 2 package mix, it is preferred to incorporate the metallic soap in the second package, the contents of which are incorporated into the foam produced by whipping the contents of the first package. Those mixes having all the ingredients in a single package may have the metallic soap mixed intimately therewith.

If it is desired to market a metallic soap for use in foam batter type cakes as a separate article, it is necessary that it be sufficiently diluted to make thorough mixing possible at the time it is incorporated into an egg foam or foam batter. The soap should be diluted at least 50 times to achieve this result. It is preferred that the metallic soap be diluted to a greater extent, e. g., 1500 to 3000 times, particularly if intended for use in the usual household size cakes. Even greater dilution is not harmful as long as the specific diluent and the amount used is compatible with the cakes of the foam batter type. As aforementioned, when the metallic soap is a part of the cake mix and is well dispersed in the mix, there is no need to consider a dilution factor. The other ingredients of the mix serve as diluents.

Edible diluents which may be used in addition to flour and sugar are gelatin, pectin, starch, gums, alginates, dextrine, cellulose ethers, and their derivatives, proteins such as soy proteins, inert materials such as calcium carbonate and ground egg shell, and the like. It is obvious, of course, that it would be undesirable to select as a diluent some ingredient which is edible but which has an adverse effect on foam batter cakes. For example, an ingredient having a high fat or oil content would adversely affect an angel food type of cake. Moreover, a whipped egg foam cannot support large amounts of inert ingredients or excessive amounts of functional ingredients such as flour and sugar. The word compatible as used above contemplates the consideration of these factors in the selection of a diluent.

The following detailed example illustrates several embodiments of the present invention.

Package 1 was prepared by intimately mixing 38.1 grams of dried egg white having a moisture content of about 6%, 1.0 gram of sodium hexametaphosphate, 50 mg. of cream of tartar, and about 63.3 grams of sucrose. To this, 270 grams of water were added, and the mixture was whipped to form a stable foam using an ordinary household mechanical mixer, requiring about 4 minutes.

Package 2 was prepared by intimately mixing 202.1 grams of sucrose, 62.7 grams of flour, 27 grams of starch, 1 gram of sodium chloride and 2 grams of cream of tartar. This mixture was gently folded into the whipped reconstituted egg white in four stages requiring about 60 strokes and about 3 minutes. The entire mixture or foam batter was then poured into a 9 inch angel food cake tin and baked at 375° F. for about 30 minutes.

A second cake was prepared using the identical ingredients and procedure used above with the exception that 50 mg. of calcium stearate were contained in intimate admixture with package 2.

The identical ingredients and procedure of above were used to bake a third cake with the exception that 50 mg. of magnesium stearate were well mixed with 5 grams of calcium carbonate and folded into the whipped egg white of package 1 after the contents of package 2 had been folded therein.

After baking, the cake employing no calcium stearate measured 103 mm. in the 9 inch cake tin, whereas each of the other cakes measured 114 mm. in the same tin. The texture of all the cakes was considered good.

The table below lists the cake height obtained when employing the above ingredients and procedure with the exception that 100 mg. of the metal soap shown was employed.

| Soap: | Cake height, ml. |
|---|---|
| Calcium oleate | 114 |
| Magnesium oleate | 114 |
| Calcium myristate | 112 |
| Sodium myristate | 112 |
| Magnesium myristate | 112 |
| Aluminum myristate | 113 |
| Aluminum stearate | 112 |
| Sodium stearate | 112 |
| Calcium palmitate | 115 |
| Sodium palmitate | 114 |
| Magnesium palmitate | 114 |

When the metal soaps with which the present invention is concerned are employed in the preparation of foam batter cakes the result is a more uniform, more reproducible cake with regard to volume, texture and other characteristics. The metal soaps provide greater recipe tolerance with regard to both formulation and manipulation. The amount of water added to reconstitute the dried egg whites, the amount of whipping required, the care used in folding flour, sugar and other ingredients into the whipped egg white, the amount of flour, the nature and type of the flour and many other factors that usually must be very rigidly controlled can be varied over relatively wide ranges and still provide a cake of excellent quality. Likewise, less attention need be paid to the presence of foreign materials such as fat. For example, the presence of even a film of fat in the cake tin will prevent the preparation of a satisfactory angel food cake in the ordinary case. Using the metallic soaps with which the present invention is concerned, however, alleviates the problem.

The one package cake mix of the foam batter type is particularly facilitated by the above-described increased recipe tolerance that is provided when the metal soaps to which the present invention is directed are employed. Of great importance in providing such a one package cake mix is the reduction of a large proportion of the fat content of the farinaceous ingredient employed in the mix. It has been found that said fat content should be in the range of about .5–1.5% of the dried egg white employed in the mix. This may be accomplished by replacing a large proportion of the flour with starch and/or a solvent extracted flour. It has been found that generally the optimum amount of metal soap which should be employed when a large proportion of starch and/or extracted flour is present in the formulation is increased as compared with the amount to be employed when flour is the sole farinaceous ingredient. However, the increased amount of metal soap so required to provide the optimum amount is not very large, being of the order of 50 mg.

An example of such a single package cake mix of the foam batter type is an angel food cake mix containing 41 g. dried egg white, 2 g. sodium hexametaphosphate, 10 g. dextrose, 200 g. coating sugar (sucrose), 2 g. cream of tartar, 1 g. sodium chloride, 125 g. wheat starch and 6 g. flour, 0.05 g. calcium stearate and 4 g. hydrolyzed soy protein. This mix is placed in the bowl of a mechanical mixer, the mixer is started and 420 g. of water is added over the period of one minute. After mixing for an additional five minutes to fully develop the foam the batter is then transferred to a 9 inch cake tin and baked at 375° F. for about 30 minutes. The resultant cake is 120 mm. high, of good texture and in general of excellent quality.

The two package angel food cake mix described in detail hereinbefore may also serve as a cake mix to be used in the preparation of a sponge cake or a chiffon cake. In using the angel food cake mix to prepare a sponge mix it is only necessary to add two fresh eggs to the ingredients of package 2, thoroughly mixing the eggs with said ingredients and then folding said ingredients into the foam prepared by reconstituting and whipping the ingredients of package 1. In the case of preparing a chiffon cake the same procedure is employed except that in addition to the two fresh eggs, one-quarter cup of vegetable oil is also added to the ingredients of package 2, the same thorough mixing being employed to distribute both the fresh eggs and oil throughout the ingredients.

It is also possible, of course, to provide a more complete sponge or chiffon cake mix by employing dried egg yolk equivalent to the yolks of two eggs, namely, about 23 g., in package 2 and, moreover, the vegetable oil may be distributed throughout the ingredients of said package by the manufacturer of such a mix. Generally this is less practical than directing the housewife to add vegetable oil at the time of making the cake since the oil presents problems of handling, packaging, storing, and the like. In either event the metal soap to which the present invention is directed is preferably incorporated in package 2 as mentioned above in connection with the angel food cake mix.

Although the invention has been described with reference to detailed examples, it is not to be limited thereby and reference is to be had to the appended claims for a definition of the limits of the invention.

What is claimed is:

1. A process for preparing cakes of the foam batter type which comprises preparing a stable whipped foam from egg white and thoroughly mixing therewith a metal soap in admixture with other edible, compatible cake-making ingredients intimately mixed with said soap in an amount sufficient to permit ease of mixing with said foam.

2. A process for preparing cakes of the foam batter type which comprises preparing a stable whipped foam from dried egg white and thoroughly mixing therewith a composition comprising a metal soap and other edible, compatible cake-making ingredients intimately mixed with said soap in an amount at least 50 times that of the metal soap.

3. The process of claim 1 in which the amount of soap admixed with the egg white foam is within the range of about 0.02–1.0% by weight of the dried egg white employed in preparing the foam.

4. The process of claim 1 in which the amount of soap admixed with the egg white foam is within the range of about 0.1–0.5% by weight of the dried egg white employed in preparing the foam.

5. The process of claim 1 in which the metal soap is a member selected from the group consisting of calcium oleate, magnesium oleate, calcium myristate, sodium myristate, magnesium myristate, aluminum myristate, aluminum stearate, sodium stearate, calcium stearate, magnesium stearate, calcium palmitate, sodium palmitate, and magnesium palmitate.

6. In the process of preparing a cake of the foam batter type using a single package mix comprising dried egg white, sucrose and a farinaceous ingredient, the improvement comprising the use of a metal soap finely divided and intimately dispersed throughout the other ingredients of said mix.

7. The process of claim 6 in which the metal soap is used in an amount within the range of 0.02–1.0% by weight of the dried egg white.

8. The process of claim 6 in which the metal soap is used in an amount within the range of 0.1–0.5% by weight of the dried egg white.

9. The process of claim 6 in which the metal soap is a member selected from the group consisting of calcium oleate, magnesium oleate, calcium myristate, sodium myristate, magnesium myristate, aluminum myristate, aluminum stearate, sodium stearate, calcium stearate, magnesium stearate, calcium palmitate, sodium palmitate, and magnesium palmitate.

10. In the preparation of a mix for use in preparing a cake of the foam batter type comprising the admixture of dried egg white, sucrose and a farinaceous ingredient, the improvement comprising incorporating a metal soap intimately mixed with said farinaceous ingredient.

11. The process of claim 10 in which the metal soap is employed in an amount within the range of about 0.02–1.0% by weight of the dried egg white.

12. The process of claim 10 in which the metal soap is employed in an amount within the range of about 0.1–0.5% by weight of the dried egg white.

13. The process of claim 10 in which the metal soap is a member selected from the group consisting of calcium oleate, magnesium oleate, calcium myristate, sodium myristate, magnesium myristate, aluminum myristate, aluminum stearate, sodium stearate, calcium stearate, magnesium stearate, calcium palmitate, sodium palmitate, and magnesium palmitate.

14. A dry mix for use in preparing cakes of the foam batter type comprising dried egg white, sucrose, a farinaceous ingredient, and a metal soap, said metal soap being finely divided and dispersed throughout the dry mix and being present in about the amount of 0.02–1.0% by weight of the dried egg white.

15. A dry mix as defined in claim 14, the metal soap being present in the approximate amount of 0.1–0.5% by weight of the dried egg white.

16. The product of claim 14 in which the metal soap is a member selected from the group consisting of calcium oleate, magnesium oleate, calcium myristate, sodium myristate, magnesium myristate, aluminum myristate, aluminum stearate, sodium stearate, calcium stearate, magnesium stearate, calcium palmitate, sodium palmitate, and magnesium palmitate.

References Cited in the file of this patent

UNITED STATES PATENTS

| | | |
|---|---|---|
| 2,176,077 | Katzman | Oct. 17, 1939 |
| 2,176,079 | Katzman | Oct. 17, 1939 |
| 2,176,080 | Katzman | Oct. 17, 1939 |
| 2,183,515 | Mink | Dec. 12, 1939 |
| 2,183,516 | Mink | Dec. 12, 1939 |
| 2,243,868 | Katzman | June 3, 1941 |